United States Patent [19]
McKay et al.

[11] Patent Number: 4,483,134
[45] Date of Patent: Nov. 20, 1984

[54] LAYING OF OPTICAL WAVEGUIDES ONTO A SUPPORT FILAMENT

[75] Inventors: Glen McKay; Robert J. Williams, both of Saskatoon, Canada

[73] Assignee: Northern Telecom Limited, Quebec, Canada

[21] Appl. No.: 458,212

[22] Filed: Jan. 17, 1983

[51] Int. Cl.³ .................. G02B 5/16; H01B 13/00; B65H 81/08
[52] U.S. Cl. .................................. 57/18; 57/6; 57/9; 57/352
[58] Field of Search .................. 57/6, 9, 7, 13-15, 57/16-18, 352, 293; 350/96.23

[56] References Cited
U.S. PATENT DOCUMENTS

| 4,154,049 | 5/1979 | King et al. | 57/9 |
| 4,195,468 | 4/1980 | King et al. | 57/9 |
| 4,309,864 | 1/1982 | Hulin | 57/352 X |
| 4,309,866 | 1/1982 | Fombellida | 57/352 X |
| 4,347,697 | 9/1982 | Hope et al. | 57/9 |
| 4,384,446 | 5/1983 | Hope et al. | 57/18 X |

Primary Examiner—John Petrakes
Attorney, Agent, or Firm—R. J. Austin

[57] ABSTRACT

Apparatus for laying of optical waveguides into sinuous grooves of a support filament in which a laying device surrounding a feed path for the filament has a plurality of elongate guide elements for the waveguides, the elements extending downstream from a carrier and being inclined to the feed path to terminate in free inner ends. The guide elements are rigid and are allowed by the carrier to have lateral swinging movement to enable their free ends to follow the path of a groove in the support filament as it moves along its feed path. A groove locating projection is provided to maintain positional relationship between the carrier and support filament as the filament passes the carrier.

6 Claims, 8 Drawing Figures

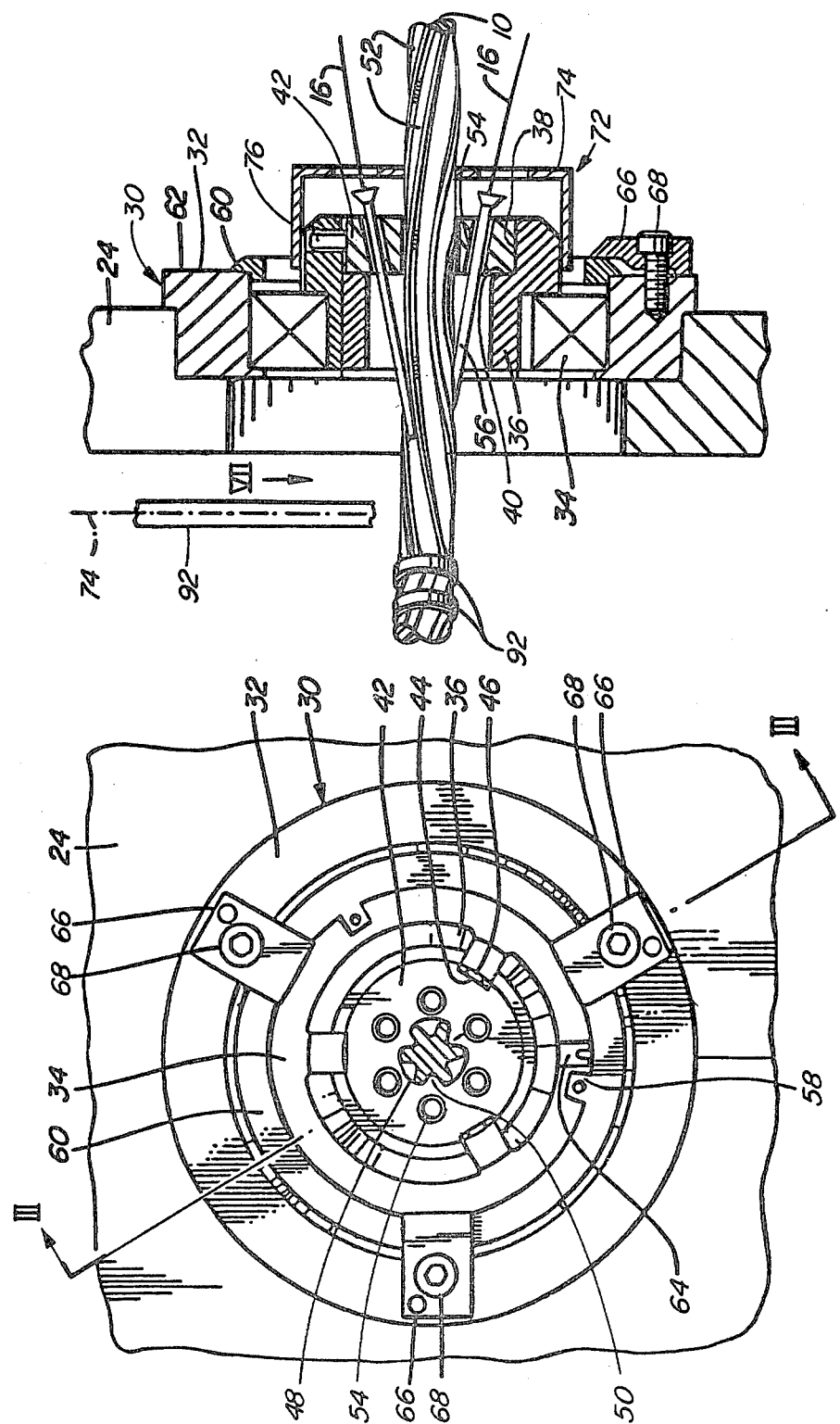

LAYING OF OPTICAL WAVEGUIDES ONTO A SUPPORT FILAMENT

This invention relates to the laying of optical waveguides onto a support filament.

Suggestions have been made in the manufacture of optical cable to locate optical waveguides in a grooved support filament. In U.S. Pat. No. 4,205,899 granted June 3, 1980 to F. D. King and T. S. Swiecicki, there is described an optical cable with a grooved support or central filament in which the grooves are identical helical with alternatively reversing twist, i.e. they change hand along the length of the filament. Hence the grooves are sinuous. To manufacture the cable, the filament is extruded by an extrusion unit provided at the die orifice with radially inwardly extending fingers, which form the grooves in the filament during extrusion. To introduce the sinuous form of the grooves, a twist unit is located downstream from the extrusion unit and this twist unit oscillates in one direction and then in the other alternately while holding the filament, thereby causing the filament to twist immediately it leaves the extrusion unit. Waveguides are then located in the grooves by being passed through a reciprocal plate which surrounds the path of the support filament, the waveguides extending along guide fingers or tubes and on radially inner ends of which are disposed within the grooves. As the filament passes through the reciprocal plate, the plate is caused to rotate by engagement of the fingers within the grooves, the location of the grooves dictating the reciprocating motion of the plate. In other U.S. patents granted to F. D. King and T. S. Swiecicki, namely U.S. Pat. Nos. 4,154,049 and 4,195,468 granted May 15, 1979 and Apr. 1, 1980 respectively, the waveguides are fed into the grooves of the support filament in the same manner as in the U.S. patent just discussed.

Because of problems associated with the entangling of the waveguides caused by the reciprocating motion of the plate as described in the above patents, a later U.S. Pat. No. 4,384,446, granted May 24, 1983 in the name of T. S. Hope and R. J. Williams, relates to apparatus for laying optical waveguides into sinuous grooves of a support filament in which the reciprocating movement of the plate is avoided. In this latter construction, a laying device disposed around the feed path for the support filament has guide projections secured to it to retain the grooves in fixed positions as they pass through the laying station. The apparatus described in this latter application also uses elongate guide elements in the form of tubes for laying the waveguides into the grooves.

In practical constructions, the tubes are made of flexible plastic material to enable free ends of the tubes to follow the sinuous shape of the grooves in the support filament as it moves downstream from the laying device. The tubes are also held securely within their laying head. During use of these tubes, while their flexibility has been considered to be an essential requirement, nevertheless, this has led to manufacturing problems. It has been found that after a period of use during which free ends of the tubes are under pressure by their contact with the bases of the grooves, the tubes have become deformed to cause their free ends to point outwardly from the grooves. As a result, on certain occasions waveguides have been incorrectly laid within the grooves and have become sandwiches between binding tape and the outer surfaces of ribs of the support filament which define the grooves. In such cases, the incorrectly laid waveguides have been compressed by the sandwiching action thus increasing the attenuation of any light signal passed along these waveguides.

It would be an advantage if apparatus could be devised to lay waveguides positively within the grooves of a grooved support filament while ensuring that the waveguides are not sandwiched by the binding tape in the above way.

According to the present invention there is provided an apparatus for laying optical waveguides into sinuous grooves of a support filament comprising a laying device disposed around the feed path for the support filament, the device comprising:

a plurality of elongate guide elements and a carrier, the guide elements extending downstream from the carrier and inwardly to free inner ends of the guide elements, the guide elements being rigid and held by the carrier to allow for lateral swinging movement of each guide element to provide a change in angle of orientation of the guide elements relative to the feed path so as to enable the inner end of the element to follow the path of a groove in the support filament as it moves downstream from the carrier; and at least one groove locating projection for engagement with a groove in the support filament to retain positional relationship between the carrier and support filament as the filament passes through the carrier.

In use of the above construction, the rigid nature of the guide elements prevents them from becoming deformed and ensures that waveguides continue to be fed desirably in correct fashion into the grooves.

Because of stresses imposed upon a support filament during manufacture, especially if it comprises a plastics grooved member extruded around a central metal cable strengthening member, the support filament will tend to be twisted, perhaps by varying amounts, from position to position along its length. Thus, at a location where the free end of a guide element enters a groove, the groove will be in a slightly different angular position from that upstream at the carrier itself. Furthermore, this different in angular position may be varying, perhaps continuously, because of the changing stresses in the support filament. This positional change is therefore unpredictable and is compounded in a support filament in which each groove extends along it in a helical fashion and the helix may change hand as it extends along the filament. The lateral swinging movement of the each guide element thus enables its inner end to alter its angular position to the feed path and relative to the groove locating projection so as to remain within its groove which has unpredictable angular movement. The flexible and deformable nature of previously suggested guide elements is thereby avoided.

In a preferred arrangement, each of the guide elements is movable longitudinally of its axis within its carrier. This permits a rigid guide element to move away from the feed path under the influence of any protuberance on the base of a groove whereby damage to the guide element or to the support filament is avoided.

Embodiments of the invention will now be described, by way of example, with reference to the accompanying drawings in which:

FIG. 2 is a cross-sectional view of part of the apparatus of FIG. 1 taken along line II—II in FIG. 1 and on a larger scale;

FIG. 3 is a cross-sectional view taken along line III—III in FIG. 2;

Figure 1:
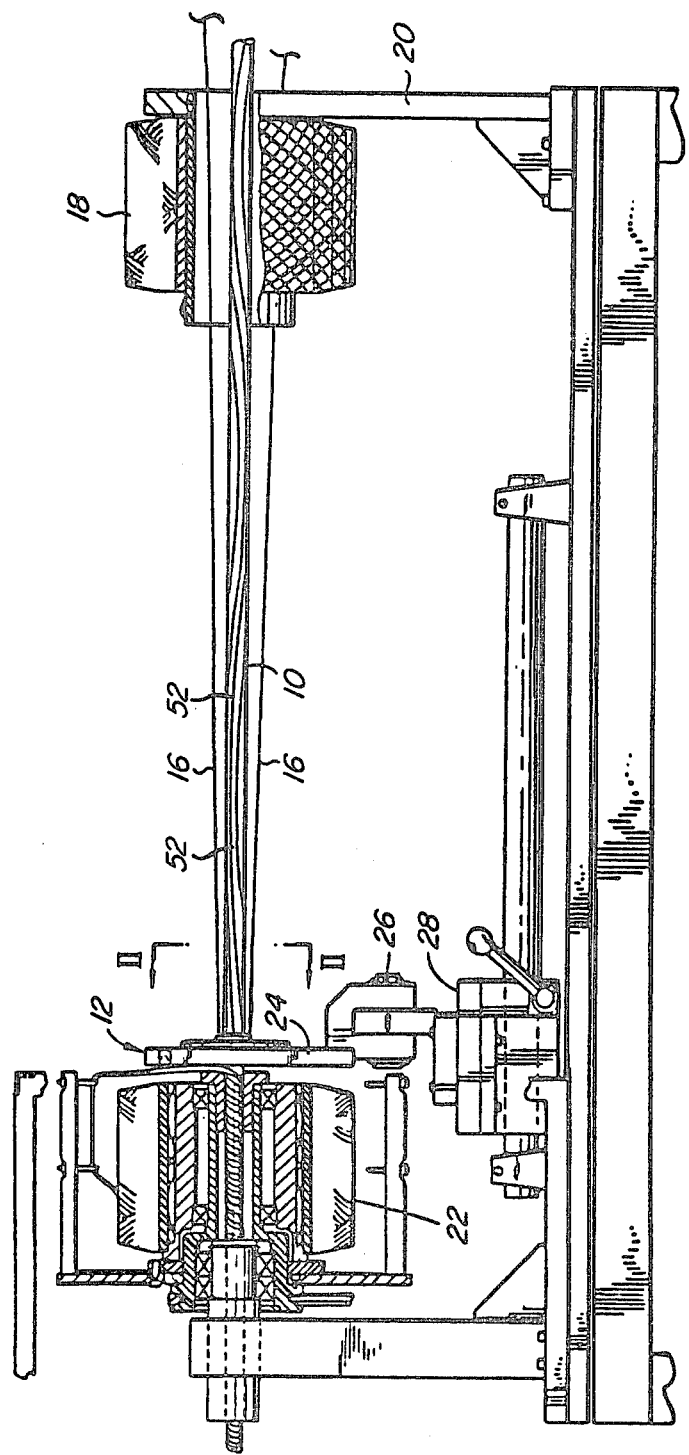
FIG. 1 is a side elevational view of part of apparatus for laying optical waveguides onto a support element and according to a first embodiment.

As shown by FIG. 1, apparatus according to a first embodiment for laying optical waveguides onto support filament 10 during optical cable manufacture comprises a laying device 12 disposed in a waveguide laying station along a feed path for the filament.

A set of optical waveguides 16 are fed from an upstream position and through a replacement spool 18 holding binding tape and carried by a replacement spool support means 20. The replacement spool 18 is to replace a spool 22 disposed in the binding station slightly downstream from the laying device 12, when the spool 22 has been used.

The laying device 12 comprises a holding means comprising two yolks 24 as shown in FIG. 2. These yolks are carried by a supporting structure 26 (FIG. 1) to a support platform 28 and are pivotally mounted so as to be moved from a closed position as shown in FIg. 2 to an open position (not shown) in which the replacement spool 18 is moveable along the filament 10 into the position occupied by the spool 22 as shown in FIG. 1. This construction, which will not be described further in this specification, is according to the invention described in U.S. Pat. No. 4,309,866, entitled "Laying and Binding Optical Waveguides Onto A Support Filament" and granted Jan. 12, 1982 in the name of Miguel Fombellida.

As shown by FIGS. 2 and 3, the yolks 24 of the laying device securely hold a laying unit 30 in the laying station. This unit 30 comprises an annular housing 32 within which is a bearing 34 rotatably mounting a short tube 36 having a large diameter passageway 38 at its upstream end terminating in a radial shoulder 40. This larger diameter passageway houses a die 42 which abuts against the shoulder 40. As shown by FIG. 2, the die 42 is provided with a plurality, e.g. with three, equally spaced apart flat depressions 44 in its peripheral surface and these depressions are occupied by location pegs 46 screw-fitted radially inwardly through the tube 36. Thus the die is held in position relative to the tube. As shown in FIG. 2, the die has a substantially circular orifice 48, the periphery of which is interrupted by at least one groove locating projection 50 which extends inwardly slightly into the orifice. In this embodiment there are these projections which are spaced apart. These projections are provided for engagement with alternative grooves 52 formed in sinous fashion along the support filament 10, as will be described. The die also is a carrier which holds six elongate guide elements for laying waveguides into each of the six grooves of the support filament and, for this purpose, is formed with six equally spaced apart bore 54, which are inclined towards the feed path of the support filament as it passes downstream through the die as shown in FIG. 3. Each guide element comprises a rigid tube 56 which extends through its associated bore 54 radially inwardly towards the feed path of the support filament as it passes downstream through the die, as shown in FIG. 3. The tubes are omitted from FIG. 2 for clarity. The rigid nature of each tube 56 is essential to the invention and, for this purpose, is conveniently made from brass, but may be of other metal such as steel. It may alternatively be made from a suitable plastics material such as a polycarbonate.

The die 42 carrying its tubes 56 is rotatable with the tube 36 within the bearing 34. For reasons to be explained, the angle of rotation of the die is restricted. This angle of rotation is limited in this embodiment to 120°, but dependent upon circumstances which will become clear, some other angle may be chosen, e.g. 90°. To restrict this angle of movement, two 120° angularly spaced abutment projections 58 are provided upon a ring 60, which abuts against the upstream end 62 of the housing 30 and a location peg 64 which extends outwardly from the tube 36 and extends to a position between the projections 58. Rotation of the die 42 is limited by the degree of movement of the peg 64 between the projections. The ring is held in position by three securing clamps 66 which extend inwardly from the surface 62 of the housing and are normally secured thereto by three screws 68. Loosening of the screws and thus of the clamps enables freedom of movement of the ring 60 so that it may be rotated into any position of adjustment in which position the die 42 is adjusted in its rotational position.

As shown by FIG. 3, each guide element or tube 56 is held by the die to allow for lateral swinging movement of the tube. This lateral swinging movement is to compensate for any change in relative angular position of the die 42 and a groove 53, within which the tube 56 is engaged while laying waveguides into the groove as will be described. The degree of allowable movement depends upon the design of the support filament and of the die 42, together with its freedom of movement within the bearing 34. To provide lateral swinging movement, each tube 56 is loosely held within its inclined bore 54 in the die 42. The tube outside diameter is approximately 3/32 inches (0.238 cm) and the bore diameter is about 0.115 inches (0.292 cm). The geometry of the tube and bore arrangement is such as to allow for about 18° total swinging movement of the tube. This allows sufficient swing to maintain the tube within a groove 52 as the grooves lie at a helix angle of approximately 4°.

With each tube contained loosely within its bore, the tube is also moveble axially within the bore. This axial movement is beneficial to the operation of the apparatus and to allow for this movement to a limited degree, a stop means is provided. As shown by FIG. 3, the stop means comprises a cap plate 72 comprising a planar base 74 held in a radial position slightly upstream (e.g. 0.032 inches) of the upstream ends of the tubes when these are engaged fully within grooves of the support filament as will be described. An annular flange 76 holds the base 74 in this position by being secured to the outer surface of the tube 36.

Figure 4:
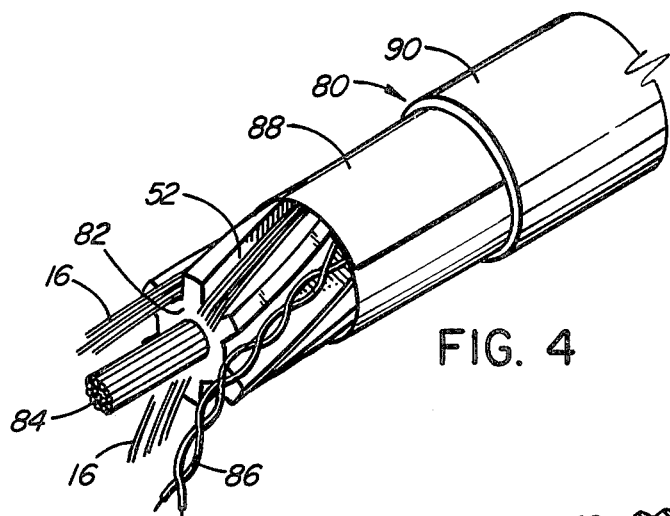
FIG. 4 is a perspective view of part of an optical cable in which the apparatus is used for its manufacture.

The apparatus of the embodiment is to be used for laying the waveguides 16 into grooves of the filament 10 during manufacture of optical cable 80 shown in FIG. 4. As shown, the support filament comprises an extruded plastics grooved member 82 surrounding a metal cable strengthening member 84 formed from twisted together steel wires. The grooves 52 in the member 82 entered helically along the member with the helical direction changing hand at predetermined positions along the member. This is shown more clearly in FIG. 1.

A plurality of optical waveguides 16 (e.g. six or eight) are contained loosely within each of the grooves 52. In one of the grooves, a twisted pair of insulated electrical conductors 86 may also be provided. Surrounding the support filament is a binder tape (not shown) surrounded by a core wrap 88. A composite sheath construction 90 covers the core wrap.

In use of the apparatus, the support filament 10 is fed along the feed path as shown in FIG. 1 and through the die 42 as shown in FIGS. 2 and 3. After passing through the laying device 12 in which the waveguides 16 are laid in the grooves as will now be described, binding tape 92 from spool 22 is wrapped around the filament to retain the waveguides in position and before the core wrap is applied. As shown by FIG. 3, as the support filament passes through the die, the tubes 56 enter the grooves and guide the waveguides from the tubes into the grooves. The waveguides are fed to the tubes from an upstream position (FIG. 1), by passing through the centre of replacement spool 18 from waveguide stores (not shown).

Figure 7:
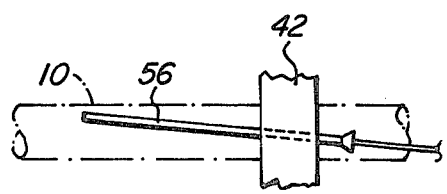
FIG. 7 is a view of the apparatus taken in the direction of arrow VII in FIG. 3.

As the support filament passes through the die 42, the angular change in position of the grooves 52 causes the die 42 and tube 36 to rotate appropriately around the filament in one direction or the other by virtue of the reception of the locating projections 50 within the grooves (FIG. 2). Because of the helical dispostion of the grooves, the angular position of each groove, at any instant, is slightly different at the position of entry of its tube 56 than at the upstream position of the projections 50. However, the downstream end of the tube is maintained within the tube as the swinging movement of the tube within its bore 54 enables the tube end to follow the position of the groove. Thus each tube is continuously swinging from side-to-side within its bore whereby the tubes move out of axial alignment with the filament as shown by FIG. 7.

As may be seen from FIG. 1, as the die 42 rotates, the waveguides are caused to twist around the filament alternately, in one direction and then in the other. If this twisting is allowed to proceed sufficiently far, then the waveguides will move inwards and into contact with the filament or, partly because of their slackness, will contact one another. At this point, there is a danger of the waveguides becoming tied up together or with the filament. To prevent the waveguides from twisting this far, angular movement of the die is restricted to a safe amount by the angular spacing between the projections 58 (FIG. 2).

Of course, the helical twist on each groove in a single direction may exceed the angular spacing between the projections 58. As a result, as the filament moves through the die, the die moves in each direction, as the grooves helically twist in that direction, until the peg 64 engages the appropriate projection 58. If the grooves then continue to twist further in the same direction before changing to the twist of opposite hand, the initially, the tubes swing laterally within their bores to accept some of the further twist. When the tubes have reached their limit of swinging movement, their rigidity is sufficient to cause the filament itself to twist around the axis of member 84 to retain the grooves in this angular position until the position of the grooves passing the tubes become of opposite lay. At this time, the filament commences to untwist and the die 42 and tubes then start to rotate in the other direction. The angle between the projections 58 in this embodiment is 120°. This angle is chosen to suit the circumstances and is made as large as possible consistent with preventing entanglement of the waveguides with one another and with the filament upstream of the die. The angle is also consistent with causing the filament to twist, at the end of each angular movement, to the smallest amount possible so as not to build up sufficient stress to cause the tubes to cut into the ribs at the sides of the grooves 52.

It is thus found with the use of the laterally swinging rigid tubes that there is no tendency for the waveguides to be directed by the tubes outwardly from the grooves. Although the tubes are rigid, this does not resuklt in an unworkable structure because the lateral swinging movement of the tubes allows the tubes to follow the grooves at an angularly displaced position from that at the guide projections 50 and without placing strain upon the sides of the grooves. Where angular movement of the die is limited as in this embodiment, twisting of the filament may be relied upon to retain the tubes within the grooves.

Figure 5:
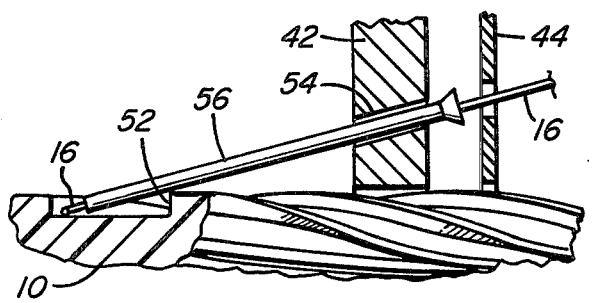
FIGS. 5 and 6 are cross-sectional views on a larger scale than FIG. 3, taken along the axis of the filament and part of the apparatus and showing operation of the apparatus in use.
Figure 6:
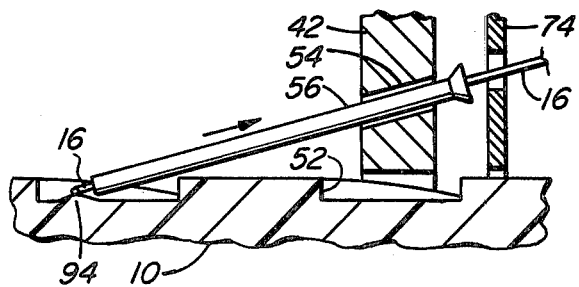

One other advantage stems from the loosely held tubes to allow for their lateral movement. This is that the tubes are free to move and are easily moved lengthways by any projections with which they come into contact on the bases of the grooves. Hence, no strain is placed upon the tubes nor upon the filament. For instance as shown in FIGS. 5 and 6, if a projection 94 moves beneath a tube, then it has the effect of raising the tube by causing it to move lengthways along its bore 54 until the projection has passed. This lengthways movement takes place although it is in a direction of opposite sense from the feed direction of the filament. The distance of lengthways movement of each tube as allowed for by the plate 72 is sufficient for it to ride over any raised imperfection which is likely to be found at the base of each groove. The allowable distance of movement is of course limited by the requirement to retain the tubes continuously within the grooves even when they are disposed beneath the filament as the die 42 rotates.

Figure 8:
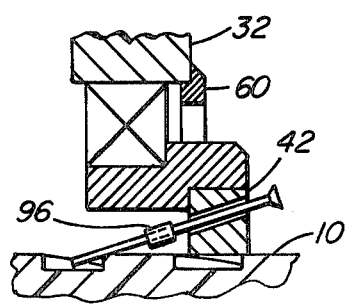
FIG. 8 is a view similar to FIG. 3 and of a modification of the embodiment.

In a modification of the embodiment as shown by FIG. 8, the cap plate 72 is replaced by a stop means assembled onto each tube. In the modification, the stop means is a member 96 surrounding each tube on the downstream side of the die 42 in a position to allow lengthways tube movement before engaging the die. The stop means may be any annular member secured, preferably by friction fit, to each tube. Conveniently, a shrink fit plastics material suffices for this purpose.

What is claimed is:

1. An apparatus for laying optical waveguides into sinous grooves of a support filament comprising a laying device disposed around the feed path for the support filament, the device comprising:

a plurality of elongate guide elements for optical waveguides and a carrier, the guide elements extending downstream from the carrier and inwardly to free inner ends of the guide elements, the guide elements being rigid and held by the carrier to allow for lateral swinging movement of each guide element to provide a change in angle of orientation of the guide elements relative to the feed path and relative to the carrier so as to enable the inner end of the element to follow the path of a groove in the support filament as it moves downstream from the carrier; and at least one groove locating projection for engagement with a groove in the support filament to retain positional relationship between the carrier and support filament as the filament passes through the carrier.

2. Apparatus according to claim 1 wherein each of the guide elements is moveable longitudinally of its axis relative to the carrier and stop means is provided to limit the amount of longitudinal movement of each guide element.

3. Apparatus according to claim 2, wherein the guide elements are rigid tubes loosely mounted within the carrier to provide the swinging movement and the stop means is a plate member disposed upstream of the tubes and for engagement by the tubes at the limit of their longitudinal movement.

4. Apparatus according to claim 2 wherein the guide elements are rigid tubes loosely mounted within the carrier to provide the swinging movement and the stop means is an annular member surrounding and secured to each tube and for engagement with a downstream part of the carrier.

5. Apparatus according to claim 1 wherein the carrier is angularly displaceable around the feed path to enable the guide elements to follow the path of grooves formed in a support filament.

6. Apparatus according to claim 1 wherein the guide elements are rigid tubes loosely mounted within the carrier to provide the swinging movement.

* * * * *